May 19, 1953  W. F. ERRIG ET AL  2,638,984
CIRCUMFERENTIAL TIRE SLITTING TOOL
Filed Jan. 13, 1950

*INVENTOR.*
WILLIAM F. ERRIG
EDWARD S. DE HART
BY
*ATTORNEY.*

Patented May 19, 1953

2,638,984

UNITED STATES PATENT OFFICE 2,638,984

CIRCUMFERENTIAL TIRE SLITTING TOOL

William F. Errig, Jenkintown, Pa., and Edward S. De Hart, Collingswood, N. J., assignors, by direct and mesne assignments, to Food Machinery and Chemical Corporation, San Jose, Calif., a corporation of Delaware Application January 13, 1950, Serial No. 138,374

5 Claims. (Cl. 164—39)

1

This invention relates to tools for the circumferential slitting of the road engaging surfaces of pneumatic tires.

The use of circumferential slits in the road engaging surface of a tire has been found to be advantageous in preventing side slipping on the roadway, particularly when the roadway is wet. The slits have heretofore been applied by rotating the tire and making one slit, then moving the cutter transversely and making another slit, and repeating these operations until the desired number of slits have been cut. A considerable time is required to provide the desired number of circumferential slits.

It is the principal object of the present invention to provide a tool for the circumferential slitting of the road engaging surfaces of pneumatic tires with which a plurality of slits may be cut simultaneously.

It is a further object of the present invention to provide a tool, of the character aforesaid, in which the cutting blades may be quickly and easily inserted, or removed for replacement, and in which upon and by the insertion, the blades are set for cutting at a predetermined depth.

It is a further object of the present invention to provide a tool, of the character aforesaid, in which the blades are set with their cutting edges disposed in a predetermined transverse arcuate arrangement to conform to the transverse shape of the exterior road engaging surface of the tire casing.

It is a further object of the present invention to provide a tool, of the character aforesaid, which may be used with tire incising or deskidding equipment now available on the market.

Other objects and advantageous features of the invention will be apparent from the specification and claims.

The nature and characteristic features of the invention will be more readily understood from the following description, taken in connection with the accompanying drawings forming part hereof, in which.

2

It should, of course, be understood that the description and drawings herein are illustrative merely, and that various modifications and changes may be made in the structure disclosed without departing from the spirit of the invention.

Like numerals refer to like parts throughout the several views.

Figure 1:
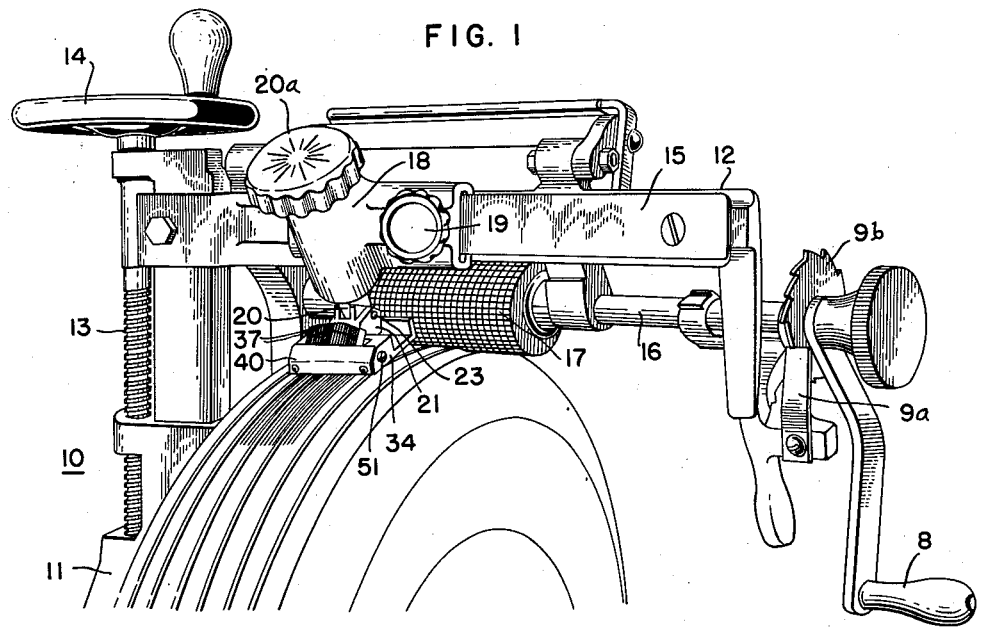
Figure 1 is a view in perspective of a portion of tire incising or deskidding machine having the tool of the present invention mounted thereon in cutting position.
Figure 2:
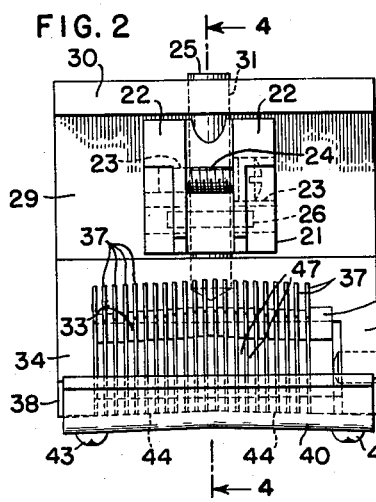
Fig. 2 is an exterior view of the tool as seen from the side opposite the cutting side.
Figure 3:
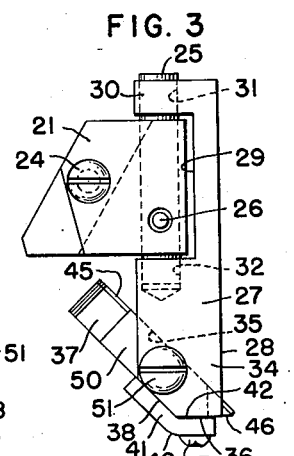
Fig. 3 is an exterior view of the tool as seen from the end.
Figure 4:
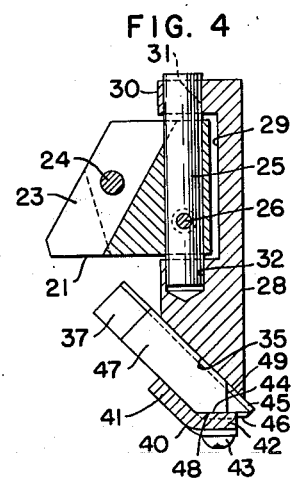
Fig. 4 is a sectional view taken approximately on the line 4—4 of Fig. 2.
Figure 5:
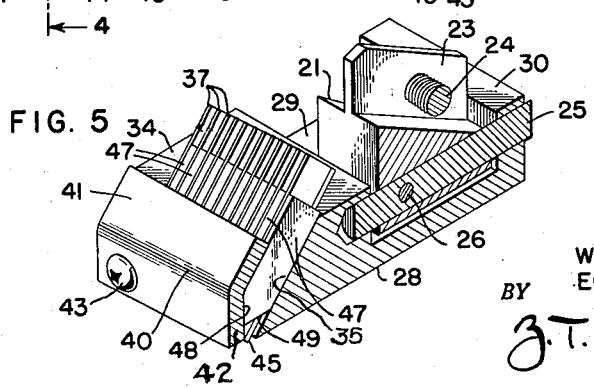
Fig. 5 is a view in perspective and in longitudinal section.

Referring now more particularly to Fig. 1, a deskidding machine is shown in part at 10, having a tire supporting frame 11 with tire supporting and guiding rollers (not shown), and having a head 12 vertically movable with respect to the frame 11 by operation of a screw 13 having an operating hand wheel 14.

The head 12 includes a tool mounting bar 15 and has mounted thereon a shaft 16. A tire advancing roller 17 is mounted on the shaft 16 for impelling engagement with the tire supported in the frame 11. A handle 8 on the shaft 16 permits of manual rotation of the shaft 16, a ratchet pawl 9a in engagement with a ratchet wheel 9b, secured to the shaft 16, limiting the direction of rotation to that required for the cutting operation to be performed.

The tool mounting bar 15 has a horizontally adjustable tool post 18 thereon which is provided with a locking screw 19 and a mounting post 20. The mounting post 20 is adjustable by a manually operable head 20a and has, in engagement therewith, a tool holder bracket 21 on which the tool in accordance with the invention is mounted.

The tool holder bracket 21 has a bifurcated side extension 22 with alined openings 23. A screw 24 extends through the openings 23 and through the mounting post 20 and locks the bracket 21 on the mounting post 20. The tool holder bracket 21 has a mounting pin 25 extending longitudinally therein and held in position by a screw 26.

A body 27 is provided, preferably in the form of a block, and with a flat contact face 28 bounding one side thereof. Oppositely disposed with respect to the face 28 and at one end of the body 27 a recess 29 is provided, bounded at the outer side by a rim 30. An opening 31 is provided in the rim 30, alined with an opening 32 in the body 27 and in which the pin 25 is adapted to be seated.

The body 27 is provided, at the end opposite the recess 29, with a blade mounting recess 33 bounded at the ends by cheeks 34. The recess 33 has a flat inclined wall 35, disposed at a predetermined angle with respect to the contact face 28. While this angle may be varied, an angle of 45° has been found satisfactory. The cheeks 34 have end faces 36, preferably perpendicular to the contact face 28, and spaced from the intersection of the wall 35 and the face 28 a predetermined distance to aid in positioning the cutter blades 37, as hereinafter explained. The cheeks 34 also have inclined end faces 38 parallel to and spaced a predetermined distance from the wall 35.

An end cap 40 is provided, having a wall portion 41 adapted to bear at its ends on the cheek end faces 38 and a rest bar portion 42 adapted to bear at its ends on the cheek end faces 36. Fasteners 43 are provided, extending through the ends of the wall portion 42 and into the cheeks 34, for holding the end cap 40 in position. The wall portion 41 and rest bar 42 are angularly disposed in accordance with the angular disposition of the wall 35 and the cheek end faces 38, and with the blade mounting recess 33 in the body 27 provide a socket for the reception of the cutter blades 37.

The interior face of the bar 42 has the central part thereof elevated, this preferably being effected by the provision of relatively flat but inclined and intersecting surfaces 44.

A plurality of cutter blades 37 are employed, each made from a straight flat strip of material and with one longitudinal edge 45 beveled to provide a cutting edge. One end of each blade 37 is beveled to provide a bevel face 46 for engagement with one of the surfaces 44 for positioning. The angle of the bevel of the face 46 is determined by the angular disposition of the wall portion 42.

It will be noted that with the structure just described the cutter blades 37 have their outer terminal ends projecting beyond the contact face 28 a predetermined distance.

The cutter blades 37 are preferably spaced by spacer blocks 47, preferably of equal or other selected thickness in accordance with the distances desired between the blades 37 and the slits to be cut.

The spacer blocks 47 have beveled end faces 48 and 49, the face 48 engaging one of the surfaces 44, and the face 49 being spaced inwardly from the terminal ends of the cutter blades 37. A spacer clamp block 50 is also provided, similar in shape to the spacer blocks 47 but of greater thickness, which is positioned in the end of the blade mounting recess 33. A tightening set screw 51, in one of the cheeks 34 and in engagement at its inner end with the spacer clamp block 50 holds the blades 37 and spacer blocks 47 securely in position, and upon loosening permits the removal and replacement, if desired, of any or all of the blades 37. The blades 37 are positioned by the engagement of their end bevels 46 in engagement with one of the surfaces 44.

The mode of use of the tool will now be pointed out.

With a tire supported in the frame 11 and with the advancing roller 17 in driving engagement therewith the body 27 is advanced downwardly until the terminal ends of the cutters 37 enter the peripheral surface and the contact face 28 lightly contacts the peripheral surface of the tire. Upon turning of the shaft 16 by the handle 8, the peripheral surface of the tire is circumferentially advanced, and a plurality of circumferential transversely spaced incisions in the form of slits, are made in the peripheral surface of the tire by the cutters 37.

By suitable adjustment of the tool post 13 on the bar 15, prior to cutting engagement of the blades 37, the incisions may be made at the desired transverse locations on the periphery of the tire.

If it is desired to replace one of the blades 37, the screw 51 is loosened and the desired blade or blades 37 may then be removed. A new blade 37, upon insertion between the appropriate spacer blocks 47, will fall into place or may be pushed into place, and will be positioned by the engagement of its end bevel 46 in engagement with one of the surfaces 44, and will thus be properly positioned with relation to the other blades for cutting a slit of predetermined depth. Upon tightening of the screw 51 the tool will then be ready for use as before.

The pivotal movement permitted by the use of the pin 25 permits of rocking of the body 29 so that it may follow the contour of the tire.

We claim:

1. In apparatus for the circumferential slitting of the peripheral surface of a tire, a blade holder having an exterior contact face for contact with the peripheral surface, said holder having an interior recess disposed at an angle to said contact face, an end closure for said holder and providing with said holder a blade receptacle with an end opening, said end closure having an interior face thereof with the central portion thereof offset with respect to the ends thereof, a plurality of parallel blades in said receptacle having portions seated on said interior face and having longitudinal cutting edges disposed parallel and extending through said end opening beyond said contact face, and means carried by said holder for holding said blades in position.

2. In apparatus for the circumferential slitting of the peripheral surface of a tire, blade holder means having an exterior contact face for contact with the peripheral surface and an interior recess disposed at an acute angle to said contact face, said holder means having an interior surface transversely disposed with respect to and bounding said recess and having an end opening therealong, a plurality of flat parallel cutter blades having their longitudinal cutting edges disposed in parallel relationship with portions extending through said end opening and outwardly with respect to said contact face, said blades having their outer end margins rearwardly inclined with respect to the cutting edges for blade positioning engagement with said interior surface, and means for clamping said blades in position in said recess.

3. In apparatus for the circumferential slitting of the peripheral surface of a tire, blade holder means having an exterior contact face for contact with the peripheral surface and an interior recess disposed at an acute angle to said contact face, said holder means having an interior surface transversely disposed with respect to and bounding said recess and having an end opening therealong, a plurality of flat parallel cutter blades having their longitudinal cutting edges disposed in parallel relationship and inclined by said interior recess with portions extending through said end opening and angularly outwardly with respect to said contact face, said blades having their outer end margins rearwardly inclined with respect to the cutting edges for blade positioning engagement with said interior surface, and means for holding said blades in position in said recess including a threaded member for applying a holding force transversely of said cutting edges.

4. In apparatus for the circumferential slitting of the peripheral surface of a tire, a blade holder having an exterior contact face for contact with the peripheral surface, said holder having an interior recess disposed at an angle to said contact face, an end closure for said holder and providing with said holder a blade receptacle with an end opening, said end closure having an interior face with the central portions thereof offset with respect to the ends thereof, a plurality of flat parallel cutter blades in said receptacle having portions seated on and positioned by said interior face and having longitudinal cutting edges disposed parallel and outer end margins rearwardly inclined with respect to the cutting edges, said margins engaging said interior face, said cutting edges extending through said end opening and outwardly beyond said contact face, and means carried by said holder for holding said blades in position in said recess.

5. In apparatus for the circumferential slitting of the peripheral surface of a tire, a blade holder having an exterior contact face for contact with the peripheral surface, said holder having an interior recess disposed at an acute angle to said contact face, said holder having an interior blade abutment surface transversely disposed with respect to and bounding said recess at one end and having an end opening therealong, said abutment face having the central portion thereof offset with respect to the ends thereof, a plurality of flat parallel cutter blades having their longitudinal cutting edges disposed in parallel relationship and inclined by said interior recess with portions extending through said end opening and angularly outwardly with respect to said contact face, said blades having outer end abutment portions for blade positioning engagement with said interior surface, and means for holding said blades in position in said recess.

WILLIAM F. ERRIG.
EDWARD S. DE HART.

References Cited in the file of this patent

UNITED STATES PATENTS

| Number | Name | Date |
|---|---|---|
| 57,976 | Sanborn | Sept. 11, 1866 |
| 2,310,153 | Rosenfarb | Feb. 2, 1943 |
| 2,360,363 | Pope | Oct. 17, 1944 |
| 2,526,029 | Judelson | Oct. 17, 1950 |

FOREIGN PATENTS

| Number | Country | Date |
|---|---|---|
| 509,571 | France | Nov. 13, 1920 |
| 839,357 | France | Jan. 4, 1939 |
| 207,174 | Switzerland | Dec. 16, 1939 |